United States Patent
Ferrari et al.

[19]

[11] Patent Number: 6,072,665
[45] Date of Patent: Jun. 6, 2000

[54] SUSPENSION ARM FOR A HEAD OF A DISK STORAGE DEVICE

[75] Inventors: Paolo Ferrari, Gallarate; Bruno Murari, Monza; Benedetto Vigna, Potenza, all of Italy

[73] Assignee: SGS-Thomson Microelectronics, S.r.l., Agrate Brianza, Italy

[21] Appl. No.: 09/104,744

[22] Filed: Jun. 25, 1998

[51] Int. Cl.[7] .................................................. G11B 5/48
[52] U.S. Cl. ............................................................ 360/104
[58] Field of Search ...................................... 360/104–106

[56] References Cited

U.S. PATENT DOCUMENTS

| | | | |
|---|---|---|---|
| 4,996,616 | 2/1991 | Aoyagi et al. | 360/103 |
| 5,189,578 | 2/1993 | Mori et al. | 360/106 |
| 5,440,437 | 8/1995 | Sanada et al. | 360/104 |
| 5,521,778 | 5/1996 | Boutaghou et al. | 360/106 |
| 5,663,854 | 9/1997 | Grill et al. | 360/104 |
| 5,796,553 | 8/1998 | Tangren | 360/104 |

FOREIGN PATENT DOCUMENTS

| | | |
|---|---|---|
| 0549 814 | 7/1993 | European Pat. Off. . |
| 62-145529 | 6/1987 | Japan . |
| 2-227886 | 9/1990 | Japan . |
| 6-187624 | 7/1994 | Japan . |

*Primary Examiner*—Allen T. Cao
*Attorney, Agent, or Firm*—Jenkens & Gilchrist, P.C.; Theodore E. Galanthay

[57] ABSTRACT

A suspension arm (125) for a head (120) of a disk storage device comprises at least one wall (225, 230) substantially perpendicular to the disk (105) and having a portion (238, 239) which is deformable parallel to a plane extending through a longitudinal axis (235) of the suspension arm (125) and perpendicular to the at least one wall (225, 230), and piezoelectric member (240, 255) which can deform the portion (238, 239) in order correspondingly to move the head (120), the piezoelectric member (240–255) being fixed to the portion (238, 239) of the at least one wall (225, 230).

33 Claims, 2 Drawing Sheets

SUSPENSION ARM FOR A HEAD OF A DISK STORAGE DEVICE

FIELD OF THE INVENTION

The present invention relates to a suspension arm for a head of a disk storage device.

BACKGROUND OF THE INVENTION

In disk storage devices, data is stored on tracks concentric with an axis of rotation of the disk. To access a block of data (for reading or writing) a reading and writing head mounted on a suspension arm is positioned in the region of the desired track.

The density of data which can be stored in these devices is limited, amongst other things, by the resolution which can be achieved in the positioning of the suspension arm. A limitation is imposed, for example, by the fact that a fairly large force is required to overcome the static friction of the head. Once in motion, the suspension arm can then be stopped only after it has travelled a minimum distance. Moreover, the deformability of the suspension arm introduces oscillations which do not allow the reading and writing head to be positioned precisely and kept in the desired position.

The deformability of the suspension arm also limits the speed of its response to a positioning request, slowing down the operation of the storage device as a whole. For example, a minimum waiting time is required in order to damp the oscillations induced in the suspension arm. Moreover, the movement of the suspension arm has to be sufficiently gradual to prevent mechanical resonance phenomena.

The density of data which can be stored and the operating speed can be increased with the use of a suspension arm having an articulated structure as described, for example, in U.S. Pat. No. 5,521,778. As described therein, a main actuator positions the suspension arm roughly and a second actuator brings about fine and rapid positioning of a tip of the suspension arm on which the reading and writing head is mounted.

A structure which enables the tip of the suspension arm to be deflected is used to correct errors in the positioning of the head on the track, as described in "Piezoelectric Microactuator Compensating for Off-Track Errors in Magnetic Disk Drives," T. Imamura, etal., *Adv. Info. Storage Syst.*, Vol.5, 1993 ISSN 1053–184X, pp. 119–126 ("Imamura"). In Imamura, the suspension arm includes an easily deformable portion which forms a hinge about which the tip of the suspension arm can pivot. Two plates of piezoelectric material arranged parallel to the disk are provided on the two sides of the hinge at a distance such as to define a suitable lever. When one piezoelectric plate lengthens and the other shortens the deformable portion is bent slightly and the tip of the suspension arm consequently pivots about the hinge.

A disadvantage of this solution is that the deformable structure thus produced weakens the suspension arm excessively. This introduces oscillations which reduce the resolution and the speed of the positioning of the suspension arm. Moreover, the greater deformability of the suspension arm increases the risk of accidental contact between the head and the disk with consequent damage to the storage device.

The object of the present invention is to avoid the aforementioned drawbacks.

SUMMARY OF THE INVENTION

The suspension arm of the present invention is particularly stiff whilst being easily deformable parallel to the disk. This reduces the oscillations of the suspension arm, enabling faster storage devices with greater data density to be produced.

The stiffness of the suspension arm also prevents accidental contact with the disk, even with knocks and vibrations, for example, in portable devices.

This suspension-arm structure enables the movement of the head to be controlled with great accuracy and the track to be followed very precisely.

Finally, the suspension arm according to the present invention is particularly compact and simple, can be formed by modifying a standard structure, and can be mass-produced at low cost.

Further characteristics and advantages of the suspension arm according to the present invention will become clear from the following description of a preferred embodiment thereof, given by way of non-limiting example, with reference to the appended drawings.

DETAILED DESCRIPTION OF A PREFERRED EMBODIMENT OF THE INVENTION

Figure 1:
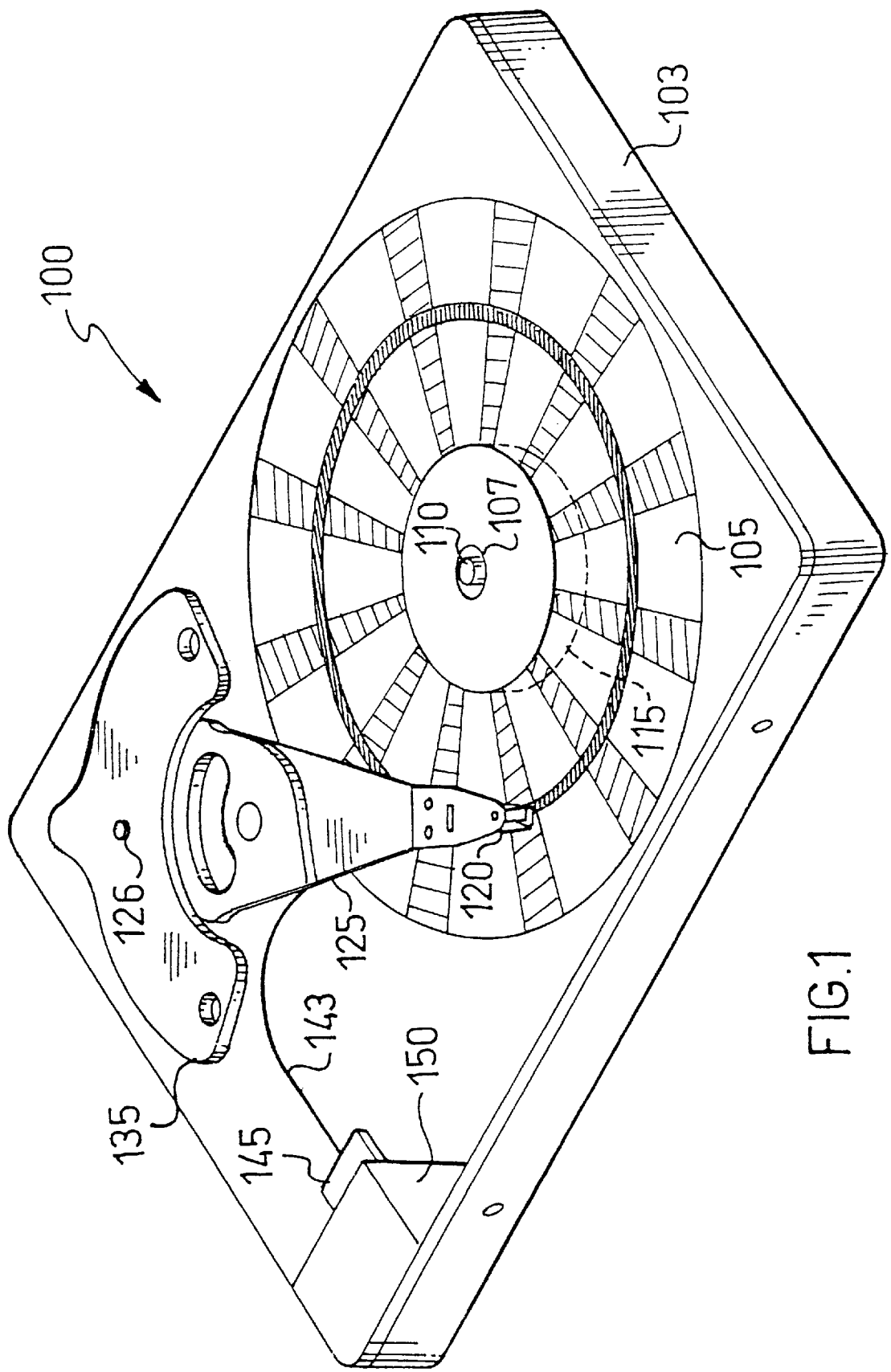
FIG. 1 shows schematically, in section view, a hard-disk storage device in which the suspension arm of the present invention can be used.

With reference in particular to FIG. 1, a hard-disk storage device 100 includes a sealed container 103 inside which there is a disk 105 constituted by a rigid circular support covered by a ferromagnetic material. The disk 105 is coupled by means of a hub 107 to a shaft 110 connected to a suitable electric motor 115; the motor 115 keeps the disk 105 rotating about the shaft 110 at a constant frequency (for example between 100 Hz and 150 Hz).

The disk 105 is divided into tracks concentric with the rotation shaft 110, each track containing a plurality of cells each for storing one bit of data represented by different magnetization states of the ferromagnetic material; typically, the density of the data along a track is, for example, of the order of 120,000 BPI (bits per inch). Data is read from and written on the disk 105 by means of a head 120. The head 120 is constituted by an electromagnetic device which can detect or vary the magnetization state of a cell disposed beneath it during a reading or a writing operation, respectively.

The storage device 100 includes a suspension arm 125 coupled at one of its ends to a pin 126; the head 120 is mounted on the suspension arm 125 at the free end thereof. A main actuator 135, typically constituted by a voice coil motor of the type used in loud speakers, pivots the suspension arm 125 about the pin 126. The head 120 is thus moved substantially radially relative to the disk 105 so as to be positioned over the desired track.

The head 120 is connected by means of a flexible cable 143 to an analog/digital circuit 145 formed in a chip of semiconductor material. The circuit 145 processes an electrical signal supplied by the head 120 during a reading operation and sends suitable control signals to the head 120 during a writing operation. The circuit 145 is connected to a control unit 150 which puts the storage device 100 into communication with the exterior. The unit 150 also is connected to the main actuator 135 and to a secondary piezoelectric actuator (described below) for controlling the positioning of the head 120 over the desired track.

In the storage device 100 described above, the data is stored only on an upper surface of the disk 105 (a single-faced disk). Similar considerations apply when both the upper surface and a lower surface of the disk are used for storing data (a double-faced disk) or if the storage device includes several disks (for example, 3 or 4 disks). In this case, the heads for reading from and writing on the two faces of each disk are mounted on a battery of suspension arms fixed together. The suspension arm of the present invention is also suitable for use with a floppy-disk or optical-disk storage device, or the like.

Figure 2:
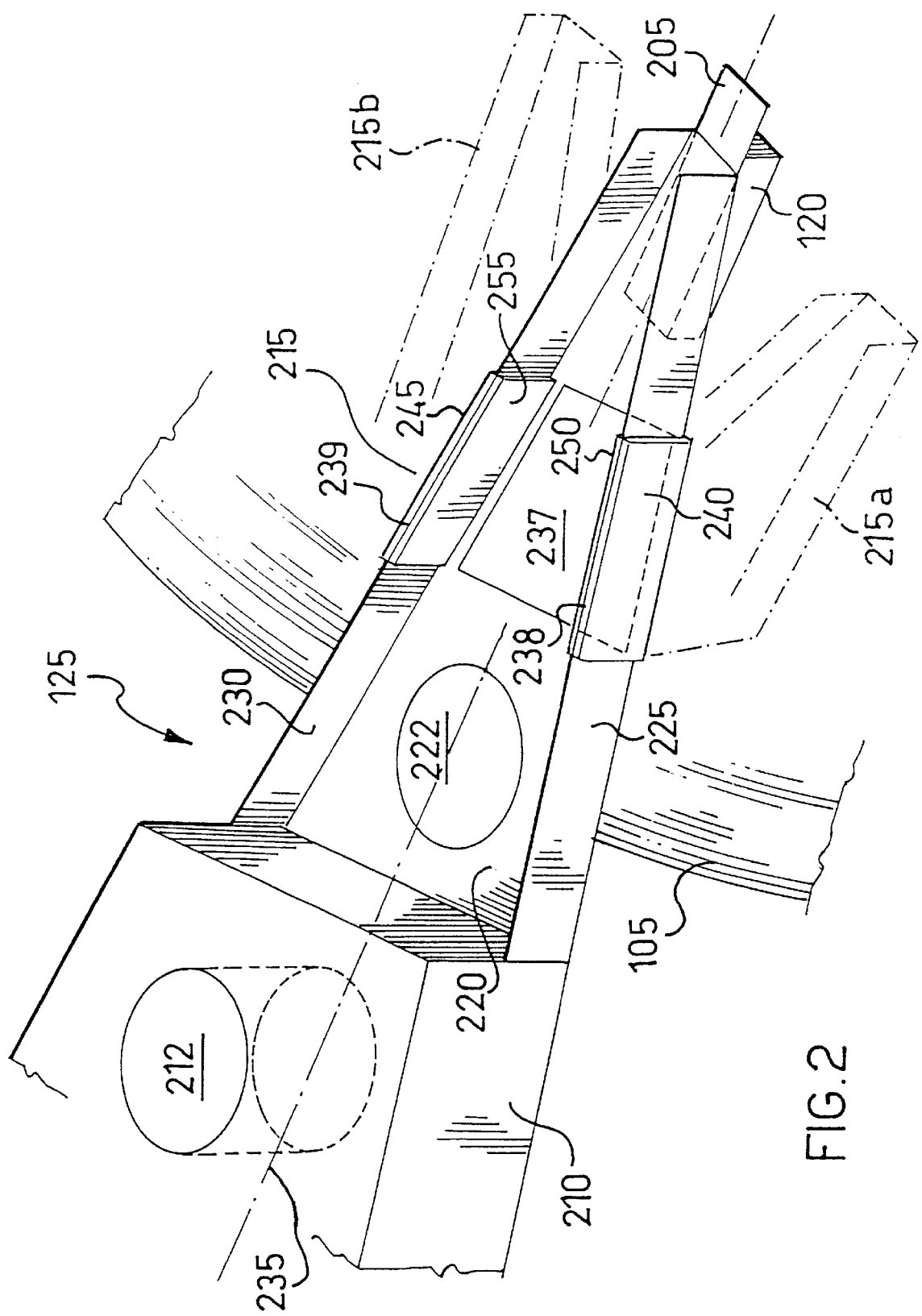
FIG. 2 is a partial view of an embodiment of the suspension arm according to the present invention.

With reference now to FIG. 2 (the elements already shown in FIG. 1 are identified by the same reference numbers), the head 120 is supported by a slider 205 and hovers on an air cushion above the upper surface of the disk 105 when the disk 105 is in rotation. The slider 205 enables the head 120 to follow the roughness of the disk 105 at an extremely small distance, for example, of a few tens of nanometers.

The suspension arm 125 has a substantially trapezoidal shape, for example, with a length of between 5 and 10 cm and with a width of 1 cm in the region of the pin (126 in FIG. 1) and 1 mm in the region of the head 120. The suspension arm 125 is constituted by a main, rigid portion 210 which occupies, for example, 60% of the overall length of the suspension arm 125. The rigid arm 210 has a thickness, for example, of between 1 and 2 mm and is made of materials (such as aluminium or magnesium) having a low mass density and hence a high resonance frequency; typically, one or more throughholes 212 with axes perpendicular to the disk 105 are formed in the rigid arm 210 in order to reduce the weight of the suspension arm 125. The rigid arm 210 has at its end a flexible suspension 215 (welded to the rigid arm 210) on the free end of which the head 120 is mounted; the suspension 215 bends in order to exert a pressure which urges the slider 205 against the upper surface of the disk 105. Typically, the suspension 215 is formed of a material (for example, steel) which has better mechanical properties, particularly resilience, than the material used to form the rigid arm 210.

The suspension 215 is commonly constituted by a plate 220 substantially parallel to the disk 105 and extending from a lower surface of the rigid arm 210; typically, one or more through-holes 222 are formed in the plate 220 to reduce the weight of the suspension 215. Two walls 225 and 230 (for example, 0.3 mm high) which are symmetrical with respect to a longitudinal axis 235 of the suspension arm 125, extend perpendicularly upwards from the longitudinal edges of the plate 220. An opening 237 is formed in the plate 220, preferably close to the head 120 (for example, at a distance of between 1 and 2 cm therefrom); the opening 237 advantageously extends as far as the vicinity of the walls 225 and 230 and has a length in the direction of the axis 235 of, for example, between 4 and 8 mm.

A respective portion 238 and 239 of each wall 225, 230 disposed close to the opening 237 is easily deformable parallel to a plane extending through the axis 235 and perpendicular to the walls 225 and 230. This deformable portion 238, 239 is preferably formed on the suspension 215, owing to the better mechanical properties of the material (steel) of which the suspension 215 is made. Moreover, the turned-over C-shaped cross-section of the suspension 215 enables this deformable portion 238, 239 to be formed without excessively weakening the suspension arm 125. The suspension arm of the present invention may, however, also be formed with the deformable portion on the rigid arm, with the use of a different number of vertical walls, (or even only one vertical wall), with parallel vertical walls, etc.

A plate of piezoelectric material 240, 245 is fixed, for example, by gluing or welding to each deformable portion 238, 239 on an outer surface of the wall 225, 230. Similarly, a further plate of piezoelectric material 250, 255 is fixed to an inner surface of each wall 225, 230; the plates 250 and 255 are arranged facing the plates 240, 245, respectively. It should be noted that the suspension arm 125 described above is reinforced by the plates 240–255 in the region of the opening 237 so as to ensure adequate stiffness of the structure as a whole. Moreover, the arrangement of the plates 240–255 on the vertical walls 225–230 does not increase the height of the suspension 215 and does not therefore create any problem with regard to the packing of any further disks.

An electrode (not shown in the drawing) is disposed on a free surface of each plate 240–255; this electrode and the corresponding wall 225–230 of each plate 240–255 are connected electrically to the control unit (150 in FIG. 1). This enables the plates 240–255 to be polarized by the application of a suitable voltage (for example, 10 V) between the vertical walls of each plate 240–255. The plates 240–255 of piezoelectric material deform (shorten or lengthen) in the direction of the axis 235 according to the value and the direction of the voltage applied. The plates 240–255 are preferably made of ceramic material (for example, a lead, zirconium and titanium, or LZT-based alloy) suitably polarized permanently so that its elemental crystals are oriented in a dominant direction; this material has a high piezoelectric coupling coefficient ($d_{31}$) which defines the deformation per unit of voltage applied, for example, of the order of 300 pm/V. Alternatively, quartz or piezoelectric-crystal plates, or the like, are used.

The pairs of plates 240, 250 and 245, 255 are polarized in opposite directions so that, when the pair 240, 250 lengthens, the pair 245, 255 shortens, and vice versa. In rest conditions, the suspension 215 is arranged symmetrically relative to the axis 235. If the plates 240–255 are polarized in a manner such that the pair 240, 250 shortens and the pair 245, 255 lengthens, the deformable portions 238 and 239 are correspondingly shortened and lengthened, respectively, parallel to the disk 105. The suspension 215 pivots towards the position 215a (shown in broken outline); the head 120 is consequently displaced by this movement, amplified by the lever effect introduced by the distance between the deformable portions 238, 239 and the head 120. If the voltage polarizing the plates 240–255 is reversed so that the pair 240, 250 lengthens and the pair 245, 255 shortens, the portions 238, 239 are similarly deformed, moving the suspension 215 towards the position 215b (shown in broken outline). The use of two pairs of piezoelectric plates advantageously amplifies the movement brought about by each individual pair. The present invention may, however, also be implemented by the provision of the plates of piezoelectric material on only one vertical wall, with the use of a different number of plates of piezoelectric material for each wall (or even only one plate), or with the use of other equivalent piezoelectric means.

The main actuator (135 in FIG. 1) positions the suspension arm 125 roughly with a resolution of a few $\mu$m. The piezoelectric structure described above defines a secondary actuator which positions the head 120 finely and rapidly with a resolution of the order of 0.1 $\mu$m. The data density of the storage device can thus be increased, resulting in the production of disks with a track density, for example, of 25,000 TPI (tracks per inch). The movement of the head 120 is also extremely quick (since there is no static friction), reducing the accessing times of the disk.

Naturally, in order to satisfy contingent and specific requirements, an expert in the art may apply to the suspension arm described above many modifications and variations all of which, however, are included within the scope of protection of the invention as defined by the following claims.

We claim:

1. A suspension arm for supporting the head of a disk storage device, comprising:

at least one wall substantially perpendicular to a disk of the disk storage device, said wall having a deformable portion which is deformable parallel to a plane extending through a longitudinal axis of the suspension arm and perpendicular to the at least one wall; and piezoelectric means for deforming the deformable portion in order to move the head, the piezoelectric means being fixed to the deformable portion of the at least one wall;

the piezoelectric means includes, on each wall, a first plate of piezoelectric material, fixed to an outer surface of the wall in the region of the deformable portion and a second plate of piezoelectric material fixed to an inner surface of the wall adjacent said first plate.

2. The suspension arm according to claim 1, wherein the first plate and the second plate are glued to the wall.

3. The suspension arm according to claim 1, wherein the first plate and the second plate are made of ceramic material.

4. A suspension arm for supporting the head of a disk storage device, comprising:

a plurality of walls substantially perpendicular to a disk of the disk storage device, each said wall having a deformable portion which is deformable parallel to a plane extending through a longitudinal axis of the suspension arm and perpendicular to the wall; and piezoelectric means for deforming the deformable portion of each wall in order to move the head, the piezoelectric means being fixed to the deformable portion of each wall;

a first and a second of the said walls arranged symmetrically with respect to the longitudinal axis of the suspension arm, wherein the piezoelectric means selectively shortens the deformable portion of one of the first wall and the second wall while substantially concurrently lengthening the deformable portion of the other wall of the first and second walls that was not shortened.

5. The suspension arm according to claim 4, wherein the piezoelectric means includes, on each wall, a first plate of piezoelectric material, fixed to an outer surface of the wall in the region of the deformable portion and a second plate of piezoelectric material fixed to an inner surface of the wall adjacent said first plate.

6. The suspension arm according to claim 5, wherein the first plate and the second plate are glued to the wall.

7. The suspension arm according to claim 5, wherein the first plate and the second plate are made of ceramic material.

8. The suspension arm according to claim 4, further comprising:

a resilient suspension for positioning the head relative to the disk, wherein the deformable portion of each wall is formed on the resilient suspension.

9. The suspension arm according to claim 8, wherein the resilient suspension comprises a plate which is substantially parallel to the disk and has a first and a second longitudinal edge from which the first and the second wall extend perpendicularly, respectively, and in which an opening is formed in the region of the deformable portion of the first wall and the deformable portion of the second wall.

10. The suspension arm according to claim 9, wherein the opening extends substantially entirely between the first wall and the second wall.

11. The suspension arm according to claim 10, wherein the piezoelectric means includes, on each wall, a first plate of piezoelectric material, fixed to an outer surface of the wall in the region of the deformable portion and a second plate of piezoelectric material fixed to an inner surface of the wall adjacent said first plate.

12. The suspension arm according to claim 11, wherein the first plate and the second plate are glued to the wall.

13. The suspension arm according to claim 11, wherein the first plate and the second plate are made of ceramic material.

14. The suspension arm according to claim 9, wherein the piezoelectric means includes, on each wall, a first plate of piezoelectric material, fixed to an outer surface of the wall in the region of the deformable portion and a second plate of piezoelectric material fixed to an inner surface of the wall adjacent said first plate.

15. The suspension arm according to claim 14, wherein the first plate and the second plate are made of ceramic material.

16. The suspension arm according to claim 14, wherein the first plate and the second plate are glued to the wall.

17. The suspension arm according to claim 8, wherein the piezoelectric means includes, on each wall, a first plate of piezoelectric material, fixed to an outer surface of the wall in the region of the deformable portion and a second plate of piezoelectric material fixed to an inner surface of the wall adjacent said first plate.

18. The suspension arm according to claim 17, wherein the first plate and the second plate are made of ceramic material.

19. The suspension arm according to claim 17, wherein the first plate and the second plate are glued to the wall.

20. A disk storage device, comprising:

a disk member on which data is capable of being stored;

a head;

a suspension arm on which the head is attached, having at least one wall, the wall including a deformable portion which is deformable so that the suspension arm is deformable in a direction that is substantially parallel to a surface of the disk member; and a first plate of piezoelectric material, fixed to an outer surface of the wall along the deformable portion and a second plate of piezoelectric material fixed to an inner surface of the wall adjacent said first plate.

21. The disk storage device according to claim 20, wherein the first plate and the second plate are glued to the wall.

22. The disk storage device according to claim 20, wherein the first plate and the second plate are made of ceramic material.

23. The disk storage device according to claim 22, wherein the suspension arm further comprises:

a first and a second of the said walls arranged symmetrically with respect to the longitudinal axis of the suspension arm, wherein the first and second plates are responsively capable of shortening the deformable portion of one of the first and second walls while concurrently lengthening the deformable portion of the other of the first and second walls.

24. The disk storage device according to claim 23, wherein the suspension arm further comprises:

a resilient suspension, wherein the for each wall, the deformable portion is formed on the resilient suspension.

25. The disk storage device according to claim 24, wherein the suspension arm further comprises:

a plate which is substantially parallel to the disk and has a first and a second longitudinal edge from which the first and the second wall extend perpendicularly, respectively, and in which an opening is formed in the region of the deformable portion of the first wall and the deformable portion of the second wall.

26. The disk storage device according to claim 25, wherein the opening extends substantially to the first wall and second wall.

27. A disk storage device according to claim 20, in which the disk storage device is a magnetic hard disk.

28. The disk storage device of claim 20, further comprising:

a control unit electrically connected to each disk member, for providing a voltage differential between the disk members so as to change at least one dimension in at least one of the first and second plates, the changed dimension causing the deformable portion of the wall to deform.

29. A suspension arm for a magnetic disk storage device, comprising:

a substantially rigid arm member;

a substantially resilient arm member extending from an end of the rigid arm member, a free end of the resilient arm member being capable of supporting a head of the magnetic disk storage device; and one or more plate members disposed along one or more surfaces of the resilient arm member, a dimension of the one or more plate members being alterable based upon an electrical signal applied thereto such that a change in the dimension of the one or more plate members responsive to the application of the electrical signal deforms the resilient arm member in at least one direction.

30. The suspension arm of claim 29, wherein:

the one or more plate members comprise a pair of plate members, each plate member being disposed along opposite surfaces of a portion of the resilient arm member and having an electrode connected thereto.

31. The suspension arm of claim 30, wherein:

each plate member is permanently polarized so that particles thereof are oriented in a dominant direction; and each plate member is situated on the resilient arm member so that the dominant direction of the particles of the plate member is substantially opposite to the dominant direction of the particles of the other plate member.

32. The suspension arm of claim 29, wherein:

the one or more plate members has a relatively high piezoelectric coupling coefficient.

33. The suspension arm of claim 29, wherein:

each plate member is constructed from a ceramic material.

* * * * *

UNITED STATES PATENT AND TRADEMARK OFFICE
CERTIFICATE OF CORRECTION

PATENT NO. : 6,072,665
DATED : June 6, 2000
INVENTOR(S) : Paolo Ferrari

It is certified that error appears in the above-identified patent and that said Letters Patent is hereby corrected as shown below:

Column 1, line 45      Replace "etal"
                       With --et al--

Column 3, line 29      Replace "throughholes"
                       With --through-holes--

Column 6, line 57      Replace "according to claim 22"
                       With --according to claim 20--

Abstract, line 8       replace "piezoelectric member"
                       with --piezoelectric means--

Abstract, line 10      replace "piezoelectric member"
                       with --piezoelectric means--

Signed and Sealed this

First Day of May, 2001

Attest:

NICHOLAS P. GODICI

Attesting Officer        Acting Director of the United States Patent and Trademark Office